United States Patent [19]

Koppa

[11] 3,946,626
[45] Mar. 30, 1976

[54] CONVEYOR SYSTEM FOR TRANSFERRING RIGID SHEETS BETWEEN RIGHT ANGLED CONVEYORS

[75] Inventor: Daniel A. Koppa, Bloomfield, N.J.
[73] Assignee: Nabisco Inc., East Hanover, N.J.
[22] Filed: Mar. 29, 1974
[21] Appl. No.: 455,977

[52] U.S. Cl.................. 83/105; 83/157; 198/20 R; 198/75; 271/184; 271/192; 271/225
[51] Int. Cl.².................. B26D 7/06; B65H 29/26
[58] Field of Search............ 83/105, 107, 155, 157, 83/163, 449; 198/32, 75, 20 R, 106; 271/225, 184, 192, 177, 180, 189; 214/6 DK

[56] References Cited
UNITED STATES PATENTS

| | | | |
|---|---|---|---|
| 1,348,553 | 8/1920 | Dowell | 83/107 |
| 2,211,433 | 8/1940 | Papendick | 83/105 |
| 2,247,678 | 7/1941 | Wolf et al. | 83/105 |
| 3,205,794 | 9/1965 | Califano et al. | 271/192 |
| 3,675,791 | 7/1972 | Russell et al. | 271/192 |
| 3,690,649 | 9/1972 | Brookhyser | 271/184 |
| 3,769,864 | 11/1973 | Morse et al. | 83/157 |

Primary Examiner—John J. Love
Assistant Examiner—Jeffrey V. Nase
Attorney, Agent, or Firm—Gerald Durstewitz; I. Allen Strombeck

[57] ABSTRACT

Large sheets of rigid cookie wafers carried by a first conveyor are longitudinally divided by a saw. The resulting small sheets are laterally spaced and each is fed between positioning guides onto a pair of edge support members positioned over a second conveyor extending at right angles to the first conveyor. Each support member is mounted on a pair of arms extending upwardly from a rotatable shaft passing beneath the second conveyor. The pair of shafts carrying each pair of edge support members are rotated simultaneously in opposite directions by a cam driven lever arrangement to separate the support members allowing the sheet supported thereby to drop upon the seond conveyor. Separate cams control each pair of shafts and the two sheets are dropped in sequence to provide an uninterrupted flow of evenly spaced sheets on the second conveyor.

8 Claims, 2 Drawing Figures

CONVEYOR SYSTEM FOR TRANSFERRING RIGID SHEETS BETWEEN RIGHT ANGLED CONVEYORS

BACKGROUND OF THE INVENTION

The present invention relates to conveyor systems for flat sheets of rigid material, and, more particularly, to such systems in which the sheets are transferred from one conveyor to a second conveyor positioned at right angles thereto.

The present invention is useable in the manufacture of sugar wafer sandwiches, which consist of alternate layers of baked porous wafers and cream filling.

The wafers are baked in large sheets and these sheets are coated on one side with cream filling and are stacked one upon another with an uncoated sheet positioned on top. This large sandwich is then cut longitudinally and transversely into the individual wafer sandwiches, a number of which are wrapped together to form a retain package.

In a high production plant, the coating, stacking and cutting operations can be accomplished at a much higher rate than the baking of the wafers, therefore, it is desirable that the output of a number of wafer ovens be consolidated in an uninterrupted flow on a single fast moving conveyor leading to the coating, stacking and cutting equipment.

The width of the wafer sheet does not effect the baking time, therefore, it is also desirable that oversized sheets be baked and that these sheets be divided to further increase the rate of wafer sheet production.

SUMMARY OF THE INVENTION

Accordingly, it is an object of the present invention to provide an improved conveyor system for transferring rigid sheets between right angled conveyors.

Another object is to provide such a system for transferring pairs of sheets positioned side by side on one conveyor to a second conveyor at right angles thereto.

Another object is to provide such a system for receiving double sized sheets on one conveyor and depositing single sized sheets onto a perpendicular conveyor.

Another object is to provide such a system which supplies a continous uninterrupted flow of sheets for subsequent coating, stacking and cutting operations.

The foregoing objects are accomplished by providing a conveyor system comprising a first conveyor, a lower level second conveyor at right angles to the first conveyor and apparatus for transferring rigid sheets from the first conveyor to the second conveyor including a plurality of members aligned with the end of the first conveyor and positioned for supporting the edges of the sheets, and means for separating the sheet supporting members to allow the sheets to fall upon the lower conveyor.

BRIEF DESCRIPTION OF THE DRAWINGS

A preferred embodiment of the invention has been chosen for purposes of illustration and description, and is shown in the accompanying drawings, forming a part of the specification, wherein.

DESCRIPTION OF THE PREFERRED EMBODIMENT

Figure 1:
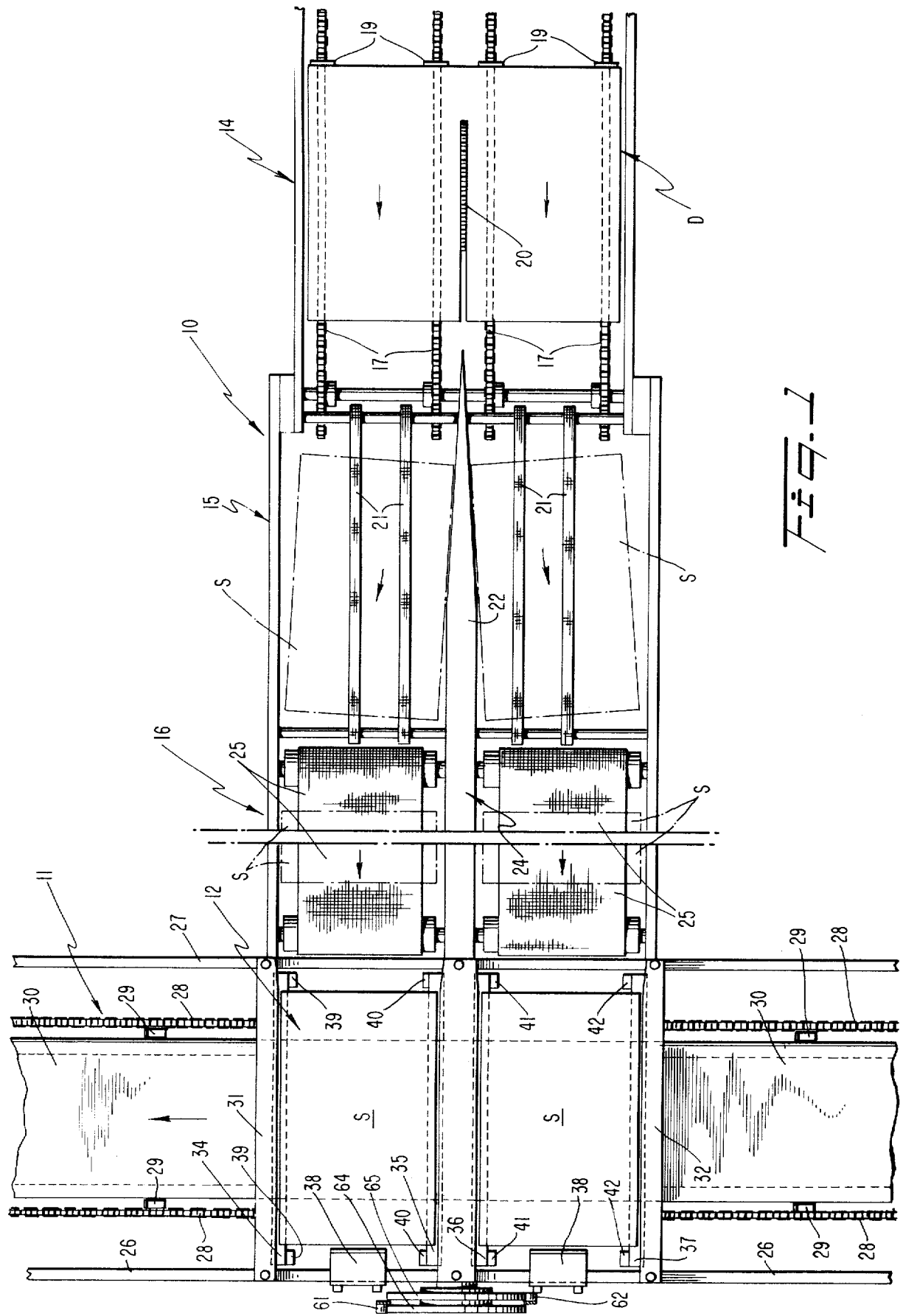
FIG. 1 is a plan view of a conveyor system according to the present invention.

Referring to FIG. 1 of the drawing in detail, there is shown a conveyor system according to the present invention which includes an infeed conveyor line 10 carrying wafer sheets from an oven, a high speed conveyor 11 for collecting wafers carried by a number of infeed conveyors and delivering them to coating and stacking machinery, and transfer apparatus 12 for receiving the wafers from the infeed conveyor line 10 and depositing them on the collecting conveyor 11.

The conveyor line 10 includes a section 14 extending from an oven, a faster moving intermediate section 15, and a still faster moving end section 16 abutting the collecting conveyor 11. The conveyor section 14 comprises four parallel endless chain conveyors 17 driven in synchronism. Each of the chain conveyors 17 carry a series of pusher plates 19 spaced at regular intervals. The pusher plates of the four chain conveyor are in lateral alignment to simultaneously engage the edge of double size wafer sheet D deposited on the conveyor section 14 at the ovens. The pusher plates move the sheet D past a centrally positioned circular saw 20 which divides the sheets D into smaller sheets S.

The sheets S move from the conveyor section 14 onto the intermediate section 15 which includes four synchronized parallel endless conveyor belts 21 each moving at a speed which is approximately 4 times the speed of the conveyor chains 17. As the sheets are transported by the conveyor section 15 they are laterally separated by a tapered section 22 of a centrally positioned guide member 24. The guide member extends to the far edge of the collecting conveyor 11 to maintain the lateral separation of the sheets. The end conveyor section 16 comprises two wide conveyor belts 25 both driven at a speed which is twice the speed of the belts 21 to move the sheets S onto the transfer apparatus 12.

The collecting conveyor 11 is mounted between two vertical frame plates 26, 27 and includes a pair of synchronized conveyor chains 28 carrying a series of pusher plates 29 spaced at regular intervals. Between the chains 28 is positioned a platform 30 on which the sheets S are deposited by the transfer apparatus 12. The pusher plates 29 extend above the level of the platform 30 to engage the edge of the sheets S and slide them along the platform 30.

Figure 2:
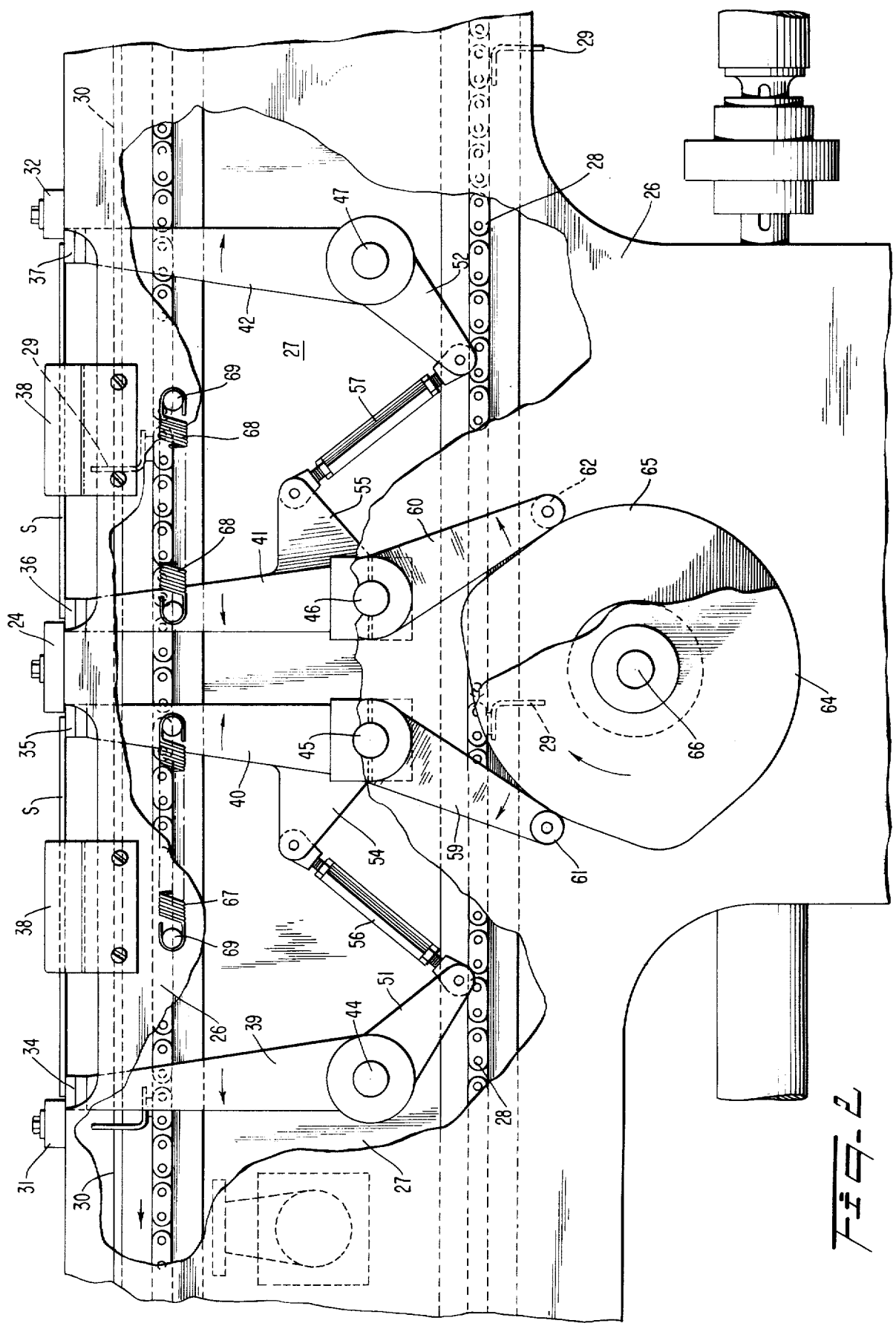
FIG. 2 is a left end elevational view of the system shown in FIG. 1 with portions of the frame broken away to reveal the inner mechanisms.

The transfer apparatus 12 includes two guide members 31 and 32 extending across the conveyor 11 to cooperate with the central guide member 24 to accurately position the sheets S on two pairs of supporting members 34, 35 and 36, 37. A pair of stop members 38 are mounted on the top of the frame plate 26 midway between the supporting members 34, 35 and 36, 37 to position the sheets transversely with respect to the conveyor 11. As shown in FIG. 2, the supporting members 34–37 are each mounted on the upper ends of a pair of arms 39–42 respectively. The arms 39–42 are mounted on shafts 44–47 respectively which extend between and are journaled in the frame plates 26 and 27. One of each of the pairs of arms 39–42 is positioned between the frame wall 27 and the adjacent conveyor chain 28, and the other is positioned between the frame wall 26 and its adjacent conveyor chain 28.

The arms 39 and 42 are formed with hubs 49 and 50 which receive the shafts 44 and 47, and operating arms 52, 52 respectively extend from the hubs 49, 50 at a downward angle toward the axis of the conveyor line 10. The arms 40 and 41 are provided with secondary arms 54 and 55 which extend generally horizontally toward the arms 39 and 42. The arm 51 is connected to the arm 54 and the arm 52 is connected to the arm 55 by adjustable linkages 56 and 57 respectively. The arms 51, 52, 54 and 55 and the linkages 56 and 57 are positioned between the frame wall 26 and the adjacent conveyor chain 28. The shafts 45 and 46 extend through the frame wall 26 and have cam following arms 59 and 60 mounted on the ends thereof. The arm 50 has a roller 61 mounted on its end on the side away from the frame wall 26 and the arm 60 is provided with a roller 62 on the side thereof closest to the wall 26. The rollers 61 and 62 each engage one of a pair of cams 64 and 65 mounted in side by side relation on a driven shaft 66. A pair of coil springs 67 and 68 are respectively connected between the arms 40 and 41 and posts 69 set in the frame wall 26 to hold the rollers against the cams.

The sheets S are propelled by the conveyor belts 25 onto the support members 34–37 and against the stop members 38. The cams 64 and 65 are continously driven and are oriented with respect to each other so that the high point of the cam 64 engages the roller 61 before the high point of the cam 65 engages the roller 62. As the roller 61 travels over the high point on the cam 64, the lever 59 rotates the shaft 45 clockwise moving the support member 35 under the guide member 24. The shaft 44 is simultaneously rotated counterclockwise by the interconnecting levers 51, 54 and linkage 56 to move the support member 34 under the guide member 31. The sheet S supported by the members 34 and 35 drops upon the platform 30 and is engaged by a set of pushers 29 and moved along the conveyor 11. A brief time interval after the first sheet S is deposited on the conveyor 11, the roller 62 travels over the high point on the cam 65 to rotate the shafts 46 and 47 and drop the second sheet.

Where three or more infeed conveyor lines supply sheets to the high speed conveyor 11, the cams 64 and 65 are normally oriented so that the two sheets are dropped into the spaces in front of successive sets of pushers 29. Before the transfer apparatus operates again, the high speed conveyor has moved a distance sufficient to accommodate the output of the other infeed conveyors. Thus where three infeed conveyors supply sheets to the high speed conveyor, the first infeed conveyor deposits sheets in the first two of each six successive spaces, the second infeed conveyor deposits in the third and fourth spaces, and the third infeed conveyor deposits in the fifth and sixth spaces. If desired, the cams 64 and 65 may be oriented so that the transfer apparatus drops its two sheets in separated (rather than consecutive) spaces. For example, if two infeed conveyors are employed, one transfer apparatus could be adjusted to drop on the first, third, fifth, etc. spaces of the high speed conveyor while the other would then be adjusted to drop on the second, fourth, sixth, etc. spaces.

It will be seen from the foregoing that the present invention provides an improved conveyor system for transferring rigid sheets between right angled conveyors and accomplishes all of the objects of the invention as stated herein before.

I claim:

1. A conveyor system comprising in combination a first conveyor means at one level, a second conveyor means at right angles to the first conveyor means and at a lower level and having an upper flight, and apparatus for transferring rigid sheets from the first conveyor means to the second conveyor means including a pair of spaced stationary guide members aligned with said first conveyor means and positioned above said second conveyor means, said guide member being spaced to receive a sheet therebetween, spaced shafts positioned below said upper flight, sheet supporting arms extending upwardly from said spaced shafts toward each of said guide members, said arms having upper ends normally positioned inwardly of each of said guide members to support a sheet above said second conveyor means, a continuously rotating cam wheel, and cam follower means operated by said cam wheel and connected to said sheet supporting arms for periodically simultaneously pivoting each of said sheet supporting arms outwardly to allow the sheet to drop on the upper flight of the second conveyor means.

2. A system according to claim 1 including sheet support members mounted to said upper ends of said sheet supporting arms and extending parallel to the first conveyor means inwardly of said guide members, said sheet support members being positioned below said guide members and move beneath said guide members when said sheet supporting arms are pivoted to drop the sheets.

3. A system according to claim 2 includng a sheet stop member to engage the forward end of the sheet moving onto the sheet supporting members to align the sheet with the second conveyor means.

4. A system according to claim 2 wherein said first conveyor means includes two spaced side by side parallel conveyor elements having closely adjacent inner edges and widely spaced outer edges, said guide members including a central member aligned with said inner edges and edge members aligned with said outer edges to guide sheets carried by each of said elements, and wherein said spaced shafts include a pair of spaced shafts for each of said conveyor elements comprising an outer shaft positioned generally below the respective edge guide member and an inner shaft positioned generally below said central guide member, said sheet supporting arms being mounted on each of said inner and outer shafts, and said central guide member being wide enough to receive a sheet supporting member from each side simultaneously.

5. A system according to claim 4 wherein said first conveyor means includes a pair of side by side conveyors spaced from said second conveyor means for transporting double sized sheets, a saw positioned between said side by side conveyors for longitudinally dividing the double size sheets, and means for laterally spacing the divided sheets in accordance with the spacing of said conveyor elements.

6. A system according to claim 4 wherein said cam wheel has an axis positioned between said inner shafts, and said cam following means includes a cam following arm mounted on each of the inner shafts, and linkage means connecting the sheet supporting arms on each pair of spaced shafts to cause said sheet supporting arms to pivot in opposite directions in response to movement of one of said sheet supporting arms, said cam following arms engaging said cam wheel to periodically pivot said sheet supporting arms to move said sheet supporting members beneath said guide members.

7. A system according to claim 6 wherein said cam wheel includes separate cam elements for each of said cam following arms, said cam elements being arranged to operate said following arms at different times to space sheets received simultaneously from said two conveyor elements at a predetermined interval on said second conveyor means.

8. A system according to claim 2 wherein said cam follower means includes a cam following arm mounted on one of said spaced shafts carrying one said sheet supporting arms, a lever arm extending from each of said sheet supporting arms at a level below said upper flight, and a link member pivoted at each end to each of said lever arms to cause said sheet supporting arms to simultaneously pivot in opposite directions.

* * * * *